V. H. RILEY.
VEHICLE SIGNAL.
APPLICATION FILED AUG. 27, 1919. RENEWED MAR. 8, 1922.
1,433,231.
Patented Oct. 24, 1922.
2 SHEETS—SHEET 1.
Fig. 1.
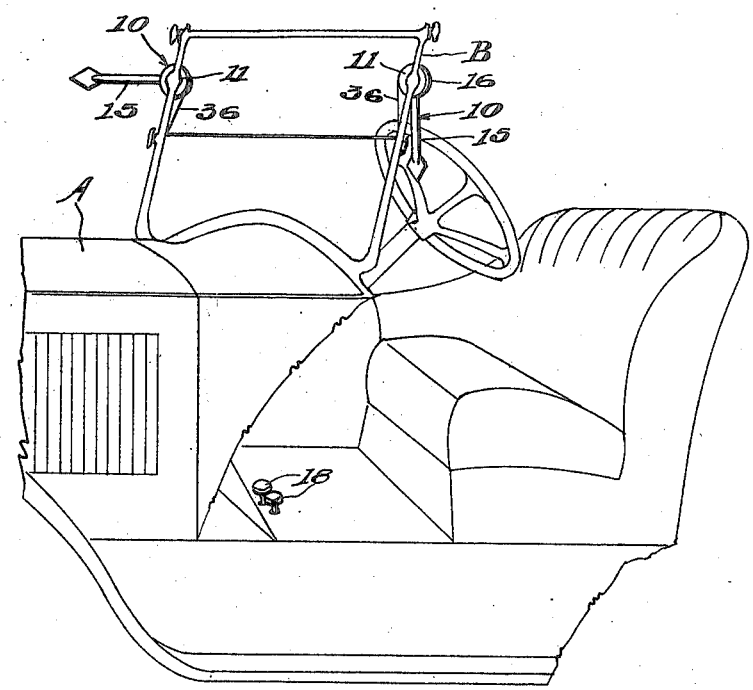
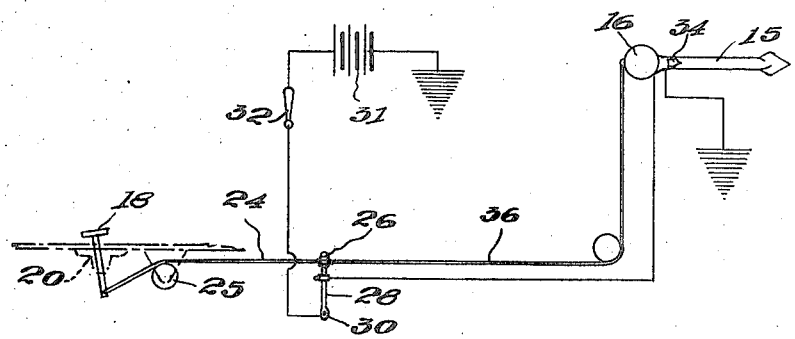
Fig. 2.
Victor H. Riley.
Inventor
By Lancaster and A. Lluvia
his
Attorneys

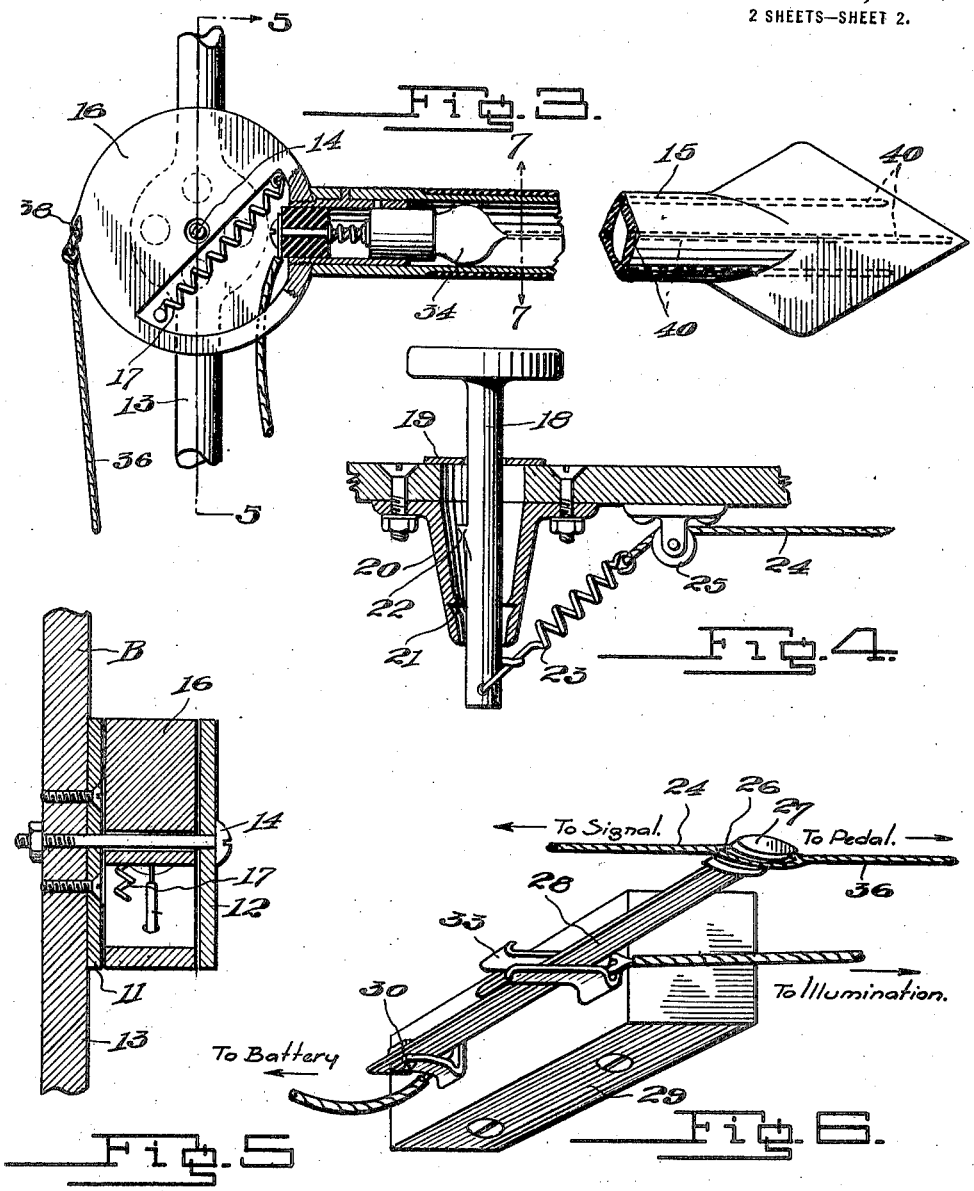

Patented Oct. 24, 1922.

1,433,231

UNITED STATES PATENT OFFICE.

VICTOR H. RILEY, OF ADA, OHIO.

VEHICLE SIGNAL.

Application filed August 27, 1919, Serial No. 320,270. Renewed March 8, 1922. Serial No. 542,168.

*To all whom it may concern:*

Be it known that I, VICTOR H. RILEY, a citizen of the United States, residing at Ada, in the county of Hardin and State of Ohio, have invented certain new and useful Improvements in Vehicle Signals, of which the following is a specification.

This invention relates to signals designed for use upon automobiles or analogous motor vehicles, by means of which the motorist may indicate the direction about to be taken by the vehicle, thereby eliminating the necessity of indicating the direction to be taken by the hand of the motorist, enabling him to devote the use of both hands to the driving of the motor vehicle, and further to provide a mechanically operated direction indicator or signal, which is comparatively simple in construction and may be applied to any approved type of existing motor vehicle, without necessitating extensive alteration therein.

A further object of the invention is to provide, in a vehicle direction signal, a novel semaphore arm, and a novel means for receiving the arm and for connecting the same to the vehicle, said means permitting the convenient actuation of the arm and the positioning of the same on the vehicle.

Other objects of the invention will appear in the following detailed description taken in connection with the accompanying drawings, forming a part of this specification and in which drawings:

Figure 1 is a fragmentary view of a motor vehicle illustrating the improved direction indicator attached thereto.

Figure 2 is a diagrammatic view of the signal or direction indicator.

Figure 3 is a detail fragmentary view partly in section of one of the indicating arms of the indicator or signal structure.

Figure 4 is a detail view partly in section of the operating pedal for the signal arm.

Figure 5 is a cross section on the line 5—5 of Figure 3.

Figure 6 is a detail perspective view of the switch structure which controls the operation of the illuminating means, and Figure 7 is a cross section on the line 7—7 of Figure 3.

Referring more particularly to the drawings, wherein like characters indicate like and corresponding parts throughout the several views, A indicates a fragment of a motor vehicle of any improved type having the windshield B mounted thereon. The signal devices or indicators 10 are mounted upon the side posts of the wind shield, and they comprise plates 11 and 12, the former of which is rigidly attached to the side arm 13 of the wind shield B, while the latter or the plate 12 is pivotally connected to the wind shield supporting arm 13 and to the plate 11 by a bolt 14. The signalling arm 15 is connected to a relatively thick disc 16 which is rotatably mounted upon the bolt 14 between the discs 11 and 12, as clearly shown in Figure 5 of the drawings. A spring 17 is connected to the disc 16, and the disc 11 for normally holding the indicating arm 15 in a downward non-exhibiting position, and the arm 15 is drawn upwardly into a horizontal outwardly extending exhibiting position by the depression of a foot pedal 18. The foot pedal 18 is slidably supported by a suitable plate 19 and it extends through a guide 20 which is provided with an annular recess 21 in the inner face thereof, which is adapted to receive therein a spur or lug 22 formed upon its stem of the pedal 18 for holding the pedal depressed against the action of the spring 17 for maintaining the indicating arm 15 in an exhibiting position. The spur 22 is released from within the annular recess 21, by a slight tilting movement of the pedal 18. A spring 23 is connected to the lower end of the stem of the pedal 18 and it has a cable or analogous flexible member 24 connected thereto which is trained over suitable guide pulleys 25 and is connected as shown at 26 to the head 27 formed upon the knife 28 of a knife switch structure 29. The knife 28 is pivotally supported as shown at 30 and has one pole of a battery or other energizing source 31 connected thereto, through a hand switch 32. The knife 28 is adapted for engagement with the contact 33, for closing a circuit through the energizing source 31 and the light bulb 34 which is carried by the arm 15. A cable 36 is connected to the head 27 of the knife 28, and it is in turn connected to the disc 16 as shown at 38, so as to permit operation of the arm 15 by the depressing of the foot pedal 18. The connecting of the cables or cords 24 and 36 to the knife blade 28 of the switch structure 29 will close the circuit through the light bulb 34, simultaneously with the elevating of the arm 15 into an exhibiting position, when the switch structure 32 is closed. In daylight, this switch 32 may be opened, which will prevent the energizing of the bulb 34.

The structure just described is duplicated, one being provided for each side of the motor vehicle so that the driver of the vehicle can, by operation of the foot pedals 18, indicate the direction about to be taken by the automobile.

The arms 15 are preferably rectangular in shape as shown in Figure 7 of the drawings, and they are made of longitudinally extending wires or rods 40, over which is placed the material of which the body 41 is formed, the said material preferably being of transparent non-breakable material, such as celluloid, transparent rubber, or the like.

Changes in details may be made without departing from the spirit of this invention, but

I claim:

1. In a direction indicator, the combination of a pair of discs disposed in axial alignment, an axial shaft carried by the discs, a disc disposed between said pair of discs and rotatably mounted upon the shaft, attaching means carried by one of the discs of the pair of discs, a semaphore arm carried by the rotatable disc, a spring connected to said rotatable disc and to one of the discs of the pair of discs, to normally hold the semaphore arm in a non-exhibiting position, and means for rotating the rotatable disc for raising said semaphore arm against the tension of said spring.

2. In a direction indicator, the combination of a pair of spaced rigidly mounted discs disposed in axial alignment, a shaft carried by the disc, a disc rotatably mounted upon said shaft between said rigidly mounted discs, attaching means carried by one of the rigid discs, said rotatable disc having a cutout portion therein, at one side thereof, a contractile coil spring disposed in the cutout portion of the rotatable disc and having its terminals connected respectively to the rotatable disc and the one of said rigidly mounted discs for normally holding the semaphore arm in a non-exhibiting position, and means secured to the periphery of the rotatable disc for rotating the rotatable disc and the semaphore arm against the tension of said spring means.

VICTOR H. RILEY.